Sept. 24, 1929.  E. J. BILLSTROM  1,729,146
GLUE CLAMP CARRIER
Original Filed Sept. 30, 1927
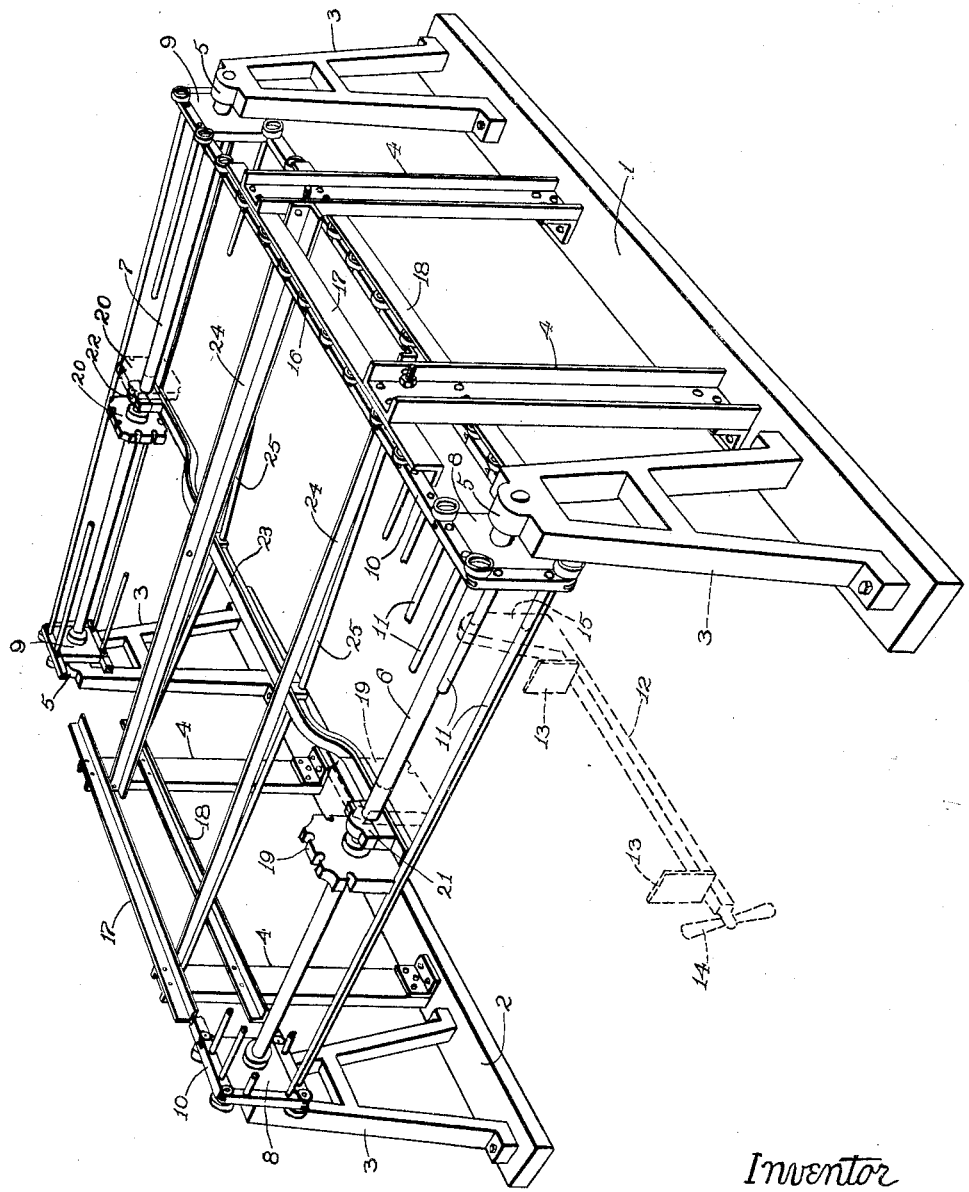

Patented Sept. 24, 1929

1,729,146

UNITED STATES PATENT OFFICE

EDWIN J. BILLSTROM, OF ROCKFORD, ILLINOIS

GLUE-CLAMP CARRIER

Application filed September 30, 1927, Serial No. 222,964. Renewed April 1, 1929.

This invention relates to glue clamp carriers used in woodworking for the supporting of a multiplicity of glued and clamped panels during the drying thereof.

Machines of this kind are provided in various widths to suit different kinds of work and in various length to accommodate the desired number of sections. These machines, briefly stated, comprise usually a driving and a driven shaft bearing sprockets for operation of a pair of endless linked chains, the links of which are joined crosswise of the machine by pairs of parallel rods which, in the case of wide machines, operate over sprockets on the driving and driven shafts for the proper support thereof against bending under the weight imposed by the panels carried by the clamp bars, which are mounted on and adjustable in relation to the rods to suit the requirements of the work being handled. In wide machines, that is, in machines where the driving and driven shafts are ten feet or more in length, there is a considerable tendency for sagging of the shafts not only under their own weight, inasmuch as they are ordinarily not of very large diameter, but also under the weight imposed thereon by the work clamped in the clamp-bars. The peculiar characteristics of this type of machine do not permit of the supporting of the driving and driven shafts intermediate their ends by frame members in the usual manner, that is, the upper and lower runs of the endless linked chain which indirectly support the glued panels make it impossible to use intermediate frame members for the central support of the driving and driven shafts. In accordance with my invention, the desired central support for the shafts is secured in a simple and effective manner by providing bearings for the two shafts carried by a longitudinal member, which in turn is carried by two or more cross members supported by the side frame members, suitable truss rods being employed in connection with the cross members, if desired, so as to insure against any likelihood of sagging. Thus, the bearings provide sturdy supports for the driving and driven shafts and since there will be no appreciable give in the machine, the work produced thereon will accordingly be of a workmanlike character.

The invention is illustrated in the accompanying drawing showing a perspective of a glue clamp carrier machine, the driving connections for which have been omitted as well as the gate at the front end thereof on which the sections are arranged to be supported one by one during the clamping of the work, only one clamp bar of one section being shown in dotted lines and all of the other sections being removed and the cross rods thereof being broken away to disclose the supports for the driving and driven shafts with which my invention is particularly concerned.

The present machine, in common with most glue clamp carriers with which I am familiar, comprises base rails 1 and 2 forming supports for the side frame members, such as the corner standards 3 and intermediate uprights 4. The standards 3 provide bearings at 5 for driving and driven shafts 6 and 7, respectively. The driving mechanism preferably connected with one end of the shaft 6 is not shown, but it will suffice to state that it is arranged to be thrown into gear when the operator has just filled and clamped a panel or section and desires to have the next section brought up into position on the gate at the front of the machine. The gate is also omitted in the drawing inasmuch as it has no relationship to the present invention. It is arranged to be automatically oscillated in and out in timed relation to the turning of the shaft 6 by the driving mechanism. A quarter turn is given to the shaft on each engagement of the driving mechanism which is just sufficient to raise a filled and clamped section off the gate and to bring an empty section into place to be filled. These features are believed to be well known in the art.

The shafts 6 and 7 have sprockets 8 and 9 fixed thereon at the ends thereof operating in endless linked chains 10. In both the wide and narrow machines the links are joined by pairs of parallel rods, shafts, or cross-bars 11 extending crosswise of the machine serving as supports for clamp bars of which the various sections of the machine are composed, a single clamp bar being illustrated in dotted lines at 12. These bars, as is well known to the art, have pairs of jaws 13 operable by the turning of handles 14 provided at the outer ends thereof, the inner ends being provided with brackets 15 having openings therein for the reception of the rods 11 whereby the clamp bars may be adjusted crosswise of the machine to suit the requirements of the work being handled. In the present machine I have illustrated the use of rollers 16 placed on the pintles of the endless linked chains 10 arranged to operate on tracks 17 and 18. The tracks 17 and 18 thus support the sections in the upper and lower runs when the sections are at intermediate positions between the driving and driven shafts at the front and rear ends of the machine. The tracks 17 and 18 are illustrated as mounted on the intermediate uprights 4. It is obvious, however, that they may, if desired, be suitably supported by the standards 3 with or without the uprights. The features thus far described are suitable for wide and narrow machines alike. In wide machines, however, that is, where the driving and driven shafts 6 and 7 are ten feet or more in length, there is a noticeable sagging of the shafts under their own weight. Furthermore, in wide machines the cross rods, which are supported intermediately by the shafts, impose considerable weight thereon and the shafts, if unsupported intermediately, are found to sag in some cases to an inordinate extent, so much in fact that the character of the work produced is seriously affected. According to my invention, as hereinafter described, I provide means for the rigid support of the driving and driven shafts intermediate the ends thereof.

The shafts 6 and 7 are illustrated as equipped with pairs of sprockets 19 and 20, respectively, conformed to receive the pairs of cross rods 11 to afford support for the latter intermediate their ends. Bearings 21 and 22 are provided for the shafts 6 and 7, respectively, between the pairs of sprockets 19 and 20, respectively. These bearings are mounted on the ends of a longitudinal frame member 23 which, in turn, is supported by cross frame members 24 fastened at their ends suitably to the uprights 4. Truss rods 25 extending between the uprights 4 crosswise of the machine also serve to support the longitudinal member 23 and cross members 24 against any tendency to sag under the load imposed thereon through the bearings 21 and 22. The support for the bearings 21 and 22, it will be manifest, is of such a nature that there is no interference whatever with the upper and lower runs of the endless linked chains and the cross rods joining the same.

In operation, it will be apparent that when a section is in position to be filled, as indicated by the clamp appearing in dotted lines at 12, the cross rods 11 supporting the section are bearing intermediate their ends on the intermediate sprockets 19 which, in turn, are supported at the bearing 21. There is, thus, no danger of any sagging of the shaft 6 either under its own weight or under the weight imposed thereon from the rods 11 through the sprockets 19. In other words, the plurality of clamp bars 12 of which the section being filled is composed are all kept absolutely in the same plane. The glued work placed therein can be clamped with every assurance that the clamp bars are in proper alignment with one another and there will be no buckling of the glued and clamped panel when the newly filled section is elevated out of the filling position, as described earlier in this specification. Obviously, when the section is traveling along the upper flight, it is supported rigidly on the tracks 17 and, furthermore, the glued and clamped panels being disposed edgewise, there will be little or no sagging possible. Hence there is no necessity for intermediate supports for the sections in the upper and lower flights of the machine. It is only at the front and rear of the machine where the sections require support intermediate their ends, the bearing 21 providing such support at the front of the machine and the bearing 22 at the back thereof.

I claim:

1. In a machine of the character described comprising side frame members, shafts supported at opposite ends on said frame members, one of said shafts being a driving shaft and the other being a driven shaft, drive sprockets on the ends of the driving shaft, idler sprockets on the ends of the driven shaft, and one or more sprockets intermediate the ends of said shafts, there being endless link belts operating over the end sprockets having cross rods for connecting associated links at opposite sides of the machine serving to carry work-holding clamp bars, the cross rods bearing intermediate the ends thereof on the intermediate sprockets, the combination with the driving and driven shafts, of means for supporting the same intermediate the ends thereof against sagging under their own weight and under the weight imposed thereon through the intermediate sprockets by the clamp bars carried by the cross rods, said means comprising bearings receiving the intermediate portions of the driving and driven shafts, a longitudinal member carrying said bearings thereon at opposite ends thereof, and means for supporting said last mentioned member from the first mentioned side frame members.

2. In a machine of the character described comprising side frame members, shafts supported at opposite ends on said frame members, one of said shafts being a driving shaft and the other being a driven shaft, drive sprockets on the ends of the driving shaft, idler sprockets on the ends of the driven shaft, there being endless link belts operating over the sprockets having cross rods for connecting associated links at opposite sides of the machine serving to carry work-holding clamp bars, the combination with the driving and driven shafts, of means for supporting the same intermediate the ends thereof against sagging, said means comprising bearings receiving the intermediate portions of the driving and driven shafts, a longitudinal member carrying said bearings thereon at opposite ends thereof, and means for supporting said last mentioned member from the first mentioned side frame members.

3. In a machine of the character described comprising a pair of upright side frame members, an endless belt-type conveyor operating therebetween, and one or more conveyor shafts extending substantially horizontally between said frame members and received in bearings therein, the frame members being disposed so far apart that there is a tendency for the shafts to sag when unsupported, the combination with said shafts, of bearings therefor arranged to support the same intermediate the ends thereof, and elements supported by the side frame members and extending between the upper and lower runs of said conveyor and arranged to support said bearings.

4. In a machine comprising an endless belt type conveyor, and side frame members for supportnig the same, the combination with a pair of conveyor shafts extending crosswise of the conveyor at the front and back of the machine and received at their ends in bearings in the side frame members, of intermediate bearings for said shafts, a longitudinal member having the bearings mounted thereon at opposite ends, the longitudinal member extending between the upper and lower runs of the endless belt type conveyor, and cross members for supporting the longitudinal member mounted on the side frame members of the machine, the cross members being likewise disposed between the upper and lower runs of said conveyor.

5. In a machine of the character described comprising side supports, conveyor shafts received at opposite ends on said supports, an endless belt-type conveyor operating on said shafts and adapted to carry work-holding clamp bars, the said shafts having sprockets or the equivalents thereon for cooperation with said conveyor, the combination with said shafts and conveyor, of means extending longitudinally of the machine between the shafts arranged to support the upper and lower runs of said conveyor and the work-holding clamp bars carried thereby, and means for supporting said shafts intermediate their ends to sustain the load imposed on the conveyor by the work-holding clamp bars at opposite ends of said machine, said means comprising bearings for the intermediate portions of said shafts, at least one longitudinal member carrying said bearings thereon at opposite ends thereof and disposed between the upper and lower runs of said conveyor, and cross-members for supporting the longitudinal member extending between the upper and lower runs of said conveyor and carried by the side supports.

6. In a clamp carrier, the combination with a frame comprising a pair of upright side frame members, and an endless conveyor mounted on said frame between the side frame members and comprising clamp receiving cross-bars, of an intermediate longitudinally extending frame member disposed substantially parallel with the side frame members between the upper and lower flights of said conveyor intermediate the ends of the cross-bars and serving as an intermediate support for the conveyor, and transverse frame members supported at their ends by the upright side frame members and having the intermediate frame member carried thereby.

7. In a clamp carrier, a frame comprising side frame members, a continuous conveyor thereon comprising a series of clamp receiving cross-bars, driving links on the ends of said cross-bars pivotally connected together to form continuous chains at opposite sides of the conveyor, driving sprockets engaging the links to drive the conveyor, tracks carried by the side frame members for the links to run upon for support of the opposite sides of the conveyor, an intermediate longitudinally extending frame member disposed between the upper and lower flights of said conveyor intermediate the ends of the cross-bars thereof, and substantially parallel with the side frame members and tracks and serving to support the conveyor intermediate the sides thereof, and transverse members supported at their ends by the side frame members and having the intermediate frame members carried thereby.

In witness of the foregoing I affix my signature.

EDWIN J. BILLSTROM.